United States Patent
Lee et al.

(10) Patent No.: US 7,519,281 B2
(45) Date of Patent: Apr. 14, 2009

(54) ELECTRONIC DEVICE WITH CAMERA AND FINGERPRINT SECURITY FUNCTION

(75) Inventors: Dong-Jae Lee, Seoul (KR); Seo-Kyu Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 11/174,807

(22) Filed: Jul. 5, 2005

(65) Prior Publication Data

US 2006/0008129 A1    Jan. 12, 2006

(30) Foreign Application Priority Data

Jul. 7, 2004    (KR)    ............... 10-2004-0052603

(51) Int. Cl.
G03B 29/00    (2006.01)
G03B 17/00    (2006.01)

(52) U.S. Cl. .................. 396/15; 396/72; 385/124

(58) Field of Classification Search .......... 396/14–15, 396/72; 359/253; 385/254, 115, 124
See application file for complete search history.

(56) References Cited

U.S. PATENT DOCUMENTS 7,126,903 B2 *  10/2006  Feenstra et al. ............ 359/253

2002/0083329 A1    6/2002    Kiyomoto

OTHER PUBLICATIONS

Japanese Patent No. JP2002196836 to Kiyomoto, having Publication date of Jun. 27, 2002 (w/ English Abstract page).
Korean Patent Application No. 1020010016613 to Choi et al., having Publication date of Oct. 11, 2002 (w/ English Abstract page).
Korean Patent Application No. 1020010067820 to Lee, having Publication date of May 14, 2003 (w/ English Abstract page).
Korean Patent Application No. 1020010017735 to Jung, having Publication dated of Dec. 7, 2001 (w/ English Abstract page).
Japanese Patent Application No. 2000-380310 to Masakuni, having Publication date of Jun. 28, 2002 (w/ English Abstract page).

* cited by examiner

*Primary Examiner*—Christopher Mahoney
(74) *Attorney, Agent, or Firm*—Monica H. Choi (57) ABSTRACT

For performing a fingerprint security function in an electronic device having a camera unit, a focus of a lens in the camera unit is adjusted to a first focus level when a control signal set indicates a normal photograph mode. Alternatively, the focus of the lens in the camera unit is adjusted to a second focus level different from the first focus level when the control signal set indicates a fingerprint photograph mode. Thus, existing components of the built-in camera are used to minimize cost and time for production of the electronic device that performs the fingerprint security function.

18 Claims, 8 Drawing Sheets

ELECTRONIC DEVICE WITH CAMERA AND FINGERPRINT SECURITY FUNCTION

BACKGROUND OF THE INVENTION

This application claims priority to Korean Patent Application No. 2004-52603, filed on Jul. 7, 2004, in the Korean Intellectual Property Office, the disclosure of which is incorporated herein in its entirety by reference.

1. Field of the Invention

The present invention relates generally to electronic devices with a camera such as a mobile phone, and more particularly, to performing a fingerprint security function in such an electronic device.

2. Description of the Related Art

The present invention is described for mobile phones as an example electronic device. However, features of the present invention may be used in other types of electronic devices with a built-in camera.

Recently, mobile phones include various functions aside from the simple calling function, such as photographing or moving picture filming functions, Internet functions, and radio or MPEG-1 layer 3 (MP3) audio file reproducing functions. As such, the importance of personal information security is increasing. Personal information security is especially important for mobile phones having functions with valuable personal information such as in case of banking via the Internet.

To protect such personal information in a conventional security mechanism, a user inputs a pre-registered password whenever the user wants to access a specific function of the mobile phone that requires security protection. However, such use of the password may not be safe because anyone who inputs the password can access such a function.

Thus, more recent security mechanisms use physiological information of a user. In that case, a user is authenticated using a physiological feature of the user for a higher level of security. Examples of such physiological information include a fingerprint or an iris of the user. Since fingerprints and irises are different for each person, such features are the first physiological information to be used in security systems. Particularly, the fingerprint is the most widely used because the fingerprint recognition rate by a fingerprint recognition device is high and because such a physiological feature is easy to use.

Meanwhile, in a mobile phone with a digital camera in the prior art, a lens of the digital camera is fixed appropriately to take portrait or landscape pictures, and thus a fingerprint cannot be photographed. Therefore, in order for a conventional mobile phone with a digital camera to photograph a fingerprint, an additional mechanism for recognizing the fingerprint needs to be added therein. For example, U.S. Patent Application No. 2002/0083329 discloses an additional fingerprint reading unit with an additional lens system that is placed onto the existing camera unit of an electronic device for capturing the fingerprint image.

In such prior art electronic devices, the size of the mobile phone will increase because space to include the additional fingerprint-recognizing mechanism is required. Also, since a mobile phone having a fingerprint-recognizing mechanism cannot be manufactured on a conventional mobile phone production line, an additional production line to manufacture the additional fingerprint-recognizing mechanism is needed. As a result, the cost of the mobile phone will increase.

SUMMARY OF THE INVENTION

Accordingly, the present invention uses existing components of the built in camera unit of an electronic device for performing the fingerprint security function.

For performing a fingerprint security function in an electronic device having a camera unit, a focus of a lens in the camera unit is adjusted to a first focus level when a control signal set indicates a normal photograph mode. Alternatively, the focus of the lens in the camera unit is adjusted to a second focus level different from the first focus level when the control signal set indicates a fingerprint photograph mode.

In another embodiment of the present invention, a fingerprint image is captured with the camera unit when the lens is set to the second focus level. Alternatively, a user-determined image is captured with the camera unit when the lens is set to the first focus level.

In a further embodiment of the present invention, characteristics information of the fingerprint image is extracted and stored in a memory when the control signal set indicates registration of a user. Alternatively, characteristics information of the fingerprint image is extracted and compared with registered characteristics information from a memory when the control signal set indicates authentication of a user.

In another embodiment of the present invention, light is emitted toward a fingerprint location when the control signal set indicates the fingerprint photograph mode. Alternatively, the light toward the fingerprint location is turned off when the control signal set indicates the normal photograph mode.

In a further embodiment of the present invention, the lens in the camera unit is moved to a first focal position when the control signal set indicates the normal photograph mode. Alternatively, the lens is moved to a second focal position when the control signal set indicates the fingerprint photograph mode.

In another embodiment of the present invention, the lens is biased with a first voltage to set the lens to have a first focal thickness when the control signal set indicates the normal photograph mode. Alternatively, the lens is biased with a second voltage to set the lens to have a second focal thickness when the control signal set indicates the fingerprint photograph mode.

The present invention may be practiced to particular advantage When the electronic device is a mobile phone. However, the present invention can also be practiced with other types of electronic devices having a built-in camera.

In this manner, existing components of the built-in camera are used to minimize cost and time for production of the electronic device that performs the fingerprint security function.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, and 10 refer to elements having similar structure and/or function.

DETAILED DESCRIPTION OF THE INVENTION

Figure 1:
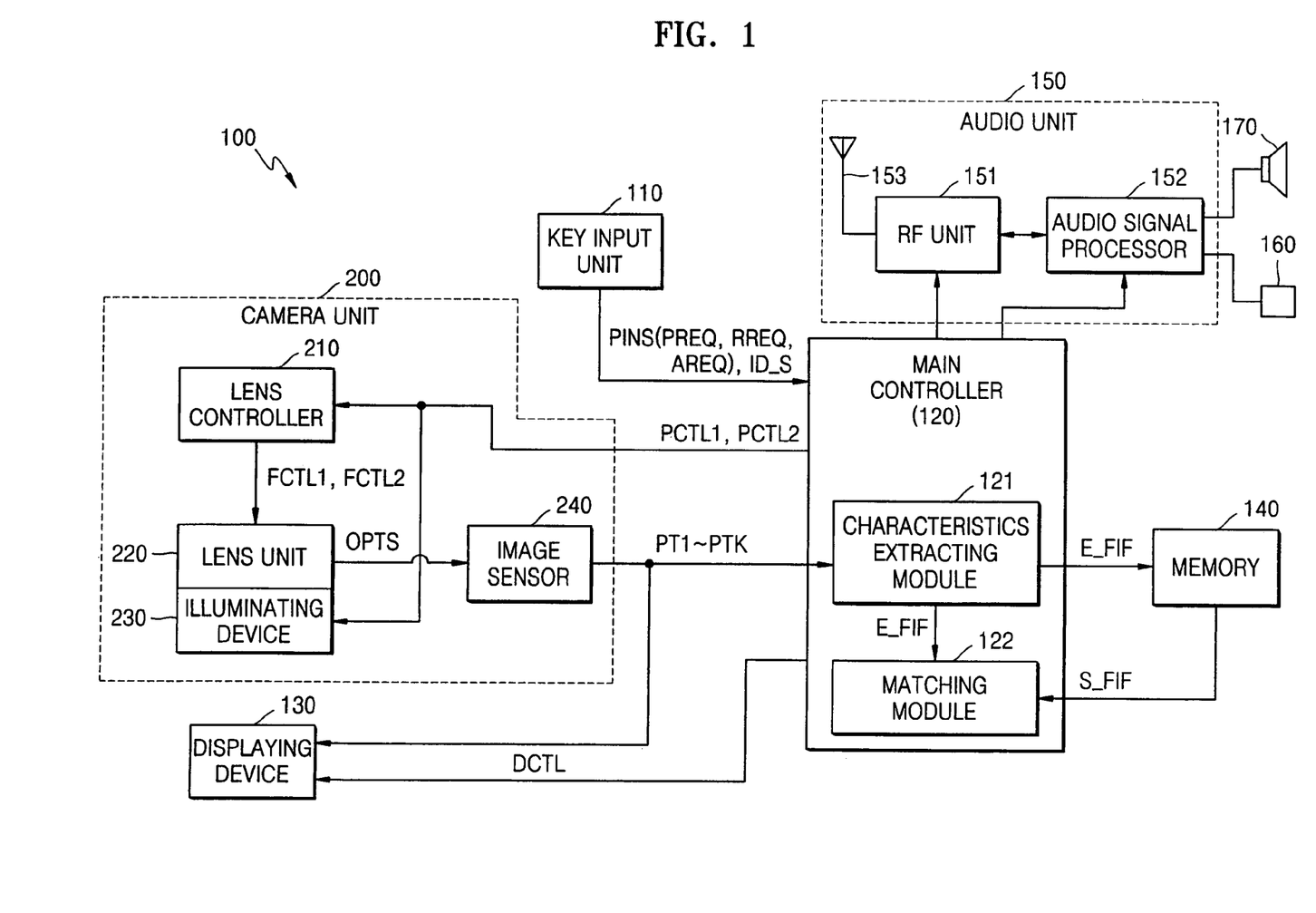
FIG. 1 is a block diagram of a mobile phone according to an embodiment of the present invention.

FIG. 1 is a block diagram of a mobile phone 100 according to an embodiment of the present invention. Referring to FIG. 1, the mobile phone 100 includes a key input unit 110, a main controller 120, a displaying device 130, a memory 140, an audio unit 150, a microphone 160, a speaker 170, and a camera unit 200.

The key input unit 110 includes a plurality of keys, and a user controls various operations of the mobile phone 100 by inputting commands to the mobile phone 100 via the key input unit 110. Also, the key input unit 110 outputs a photograph request signal PREQ when a normal photograph key (not shown) is selected, outputs a registration request signal RREQ when a fingerprint registration key (not shown) is selected, and outputs an authentication request signal AREQ when a menu key (not shown) that is set with a security function is selected. The menu key set with a security function may be, for example, a menu key for Internet banking, making an international telephone call, or accessing personal information stored in the mobile phone.

The main controller 120 controls operation of the components within the mobile phone 100. The main controller 120 operates in one of a normal photograph mode or a fingerprint photograph mode in response to a PINS control signal set including the photograph request signal PREQ, the registration request signal RREQ, and the authentication signal AREQ. The main controller 120 operates in the normal photograph mode when the photograph request signal PREQ is received, and outputs a first photograph control signal PCTL1 and a display control signal DCTL.

Alternatively, the main controller 120 operates in the fingerprint photograph mode when the registration request signal RREQ or the authentication request signal AREQ is received, and outputs a second photograph control signal PCTL2 and the display control signal DCTL. The main controller 120 deactivates the display control signal DCTL in the normal photograph mode, and activates the display control signal DCTL in the fingerprint photograph mode.

In addition, the main controller 120 includes a characteristics extracting module 121 and a matching module 122. The characteristics extracting module 121 and the matching module 122 are implemented as software algorithms performed by the main controller 120, in an example embodiment of the present invention. The characteristics extracting module 121 extracts characteristics information E_FIF of a fingerprint based on a plurality of image signals PT1 through PTK (K is an integer) that are continuously received for a predetermined period of time via the camera unit 200.

In more detail, the characteristics extracting module 121 obtains a plurality of fingerprint images by dividing each of the plurality of image signals PT1 through PTK into a background region and a fingerprint region, and generating one fingerprint image based on the plurality of fingerprint regions. Afterwards, the characteristics extracting module 121 enhances the quality of the generated fingerprint image, and then extracts the characteristics information E_FIF from the quality-enhanced fingerprint image.

The matching module 122 compares the characteristics information E_FIF of the extracted fingerprint with characteristics information S_FIF stored in the memory 140. The main controller 120 determines whether to grant a user access to a menu function according to a comparison result of the matching module 122.

The displaying device 130 responds to the display control signal DCTL and displays the photographed image based on the image signals PT1 through PTK with or without displaying a guideline 131 (see FIG. 5) for photographing a fingerprint. In more detail, when the display control signal DCTL is activated, the displaying device 130 displays the guideline 131, and when the display control signal DCTL is deactivated, the displaying device 130 does not display the guideline 131.

The memory 140 stores data to be used by the main controller 120 such as fingerprints of registered users of the mobile phone 100. Additionally referring to FIGS. 1 and 10, the memory 140 stores sequences of instructions (i.e., software programs) to be executed by a data processor 250 of the main controller 120. Such execution of the sequences of instructions by the main controller 120 causes the main controller 120 to perform the steps of FIGS. 6 and 7.

The audio unit 150 includes a radio frequency (RF) unit 151, and an audio signal processor 152. The RF unit 151 demodulates an RF signal received via an antenna 153 and outputs the RF signal. Also, the RF unit 151 modulates an audio signal received via the audio signal processor 152 and transmits the audio signal via the antenna 153. The audio signal processor 152 processes the audio signal received from the RF unit 151 to be output to the speaker 170. The audio signal processor 152 also processes an audio signal received from the microphone 160 to be output to the RF unit 151.

The camera unit 200 includes a lens controller 210, a lens unit 220, an illuminating device 230, and an image sensor 240. The lens controller 210 responds to the first photograph control signal PCTL1 and outputs a first focus control signal FCTL1, and responds to the second photograph control signal PCTL2 and outputs a second focus control signal FCTL2.

The lens unit 220 responds to the first focus control signal FCTL1 to adjust a focus of a built-in lens to a first focus level, and responds to the second focus control signal FCTL2 to adjust the focus of the lens to a second focus level. The lens unit 220 transmits an optical signal OPTS reflected from a subject (not shown) to the image sensor 240.

The illuminating device 230 is turned "on" in response to the second photograph control signal PCTL2, and is turned "off" in response to the first photograph control signal PCTL1. The illuminating device 230 is turned "on" to emit light toward a predetermined location (i.e., a fingerprint location) on which the subject (i.e., a fingerprint) is to be placed. The image sensor 240 converts the optical signal OPTS, which is continuously received after passing through the lens unit 220, into the plurality of image signals PT1 through PTK, and outputs the image signals PT1 through PTK.

Figure 2:
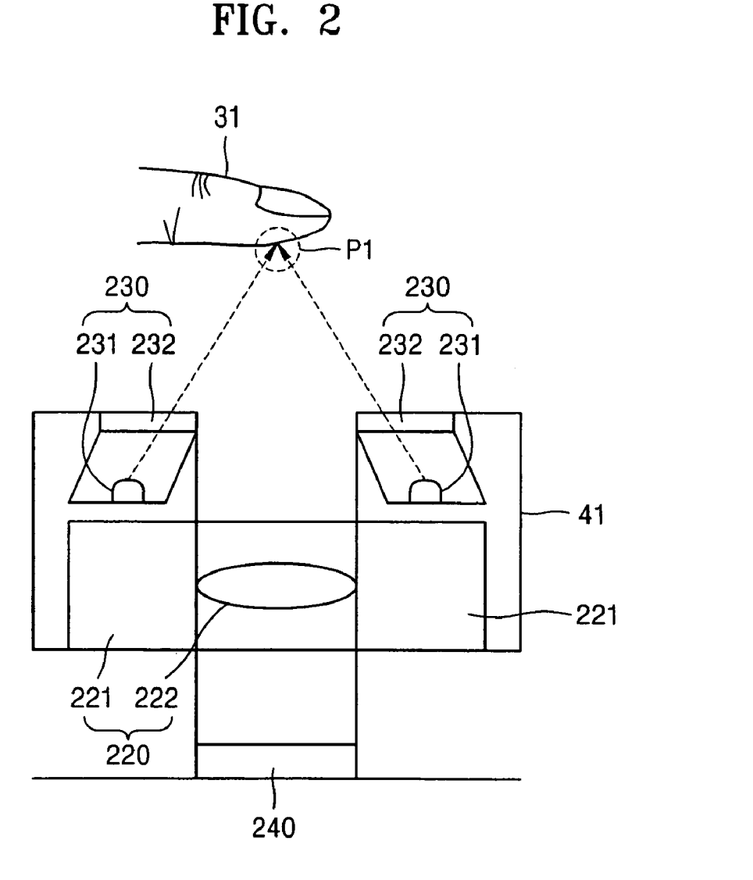
FIG. 2 is a vertical cross-sectional view of a lens unit and an illuminating device of FIG. 1, according to an embodiment of the present invention.

FIG. 2 is a vertical cross-sectional view of the lens unit 220 and the illuminating device 230 of FIG. 1. Referring to FIG. 2, the lens unit 220 includes a lens driving unit 221 and a lens 222. The lens driving unit 221 shields the lens 222, and controls a focus of the lens 222 in response to the first focus control signal FCTL1 or the second focus control signal FCTL2. The illuminating device 230 includes a plurality of emitting devices 231 and a polarizing filter 232. The plurality of emitting devices 231 are located around the lens 222, and are turned "on" in response to the second photograph control signal PCTL2.

For clearly distinguish between a ridge and a valley between the ridges of a fingerprint, light emitted by the emitting devices 231 is a visible ray or an ultraviolet radiation-A (UV-A), in an embodiment of the present invention. The polarizing filter 232 is disposed on top of the plurality of emitting devices 231. The polarizing filter 232 polarizes the light emitted by the plurality of emitting devices 231, and focuses the light to a predetermined location P1 on which a subject 31 (i.e., fingerprint) will be placed. Meanwhile, to receive light transmitted through the lens 222 after being reflected from the subject 31, the image sensor 240 is disposed below the lens 222. The lens unit 220 and the illuminating device 230 are within a single housing 41, in one embodiment of the present invention.

Figure 3:
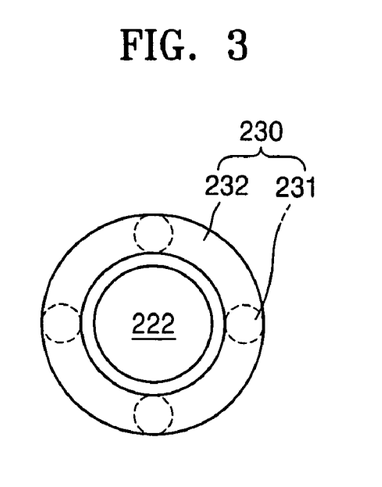
FIG. 3 is a plane view of the lens unit and the illuminating device of FIG. 2, according to an embodiment of the present invention.

FIG. 3 is a plane view of the lens unit 220 and the illuminating device 230 of FIG. 2. Referring to FIG. 3, the emitting devices 231 of the illuminating device 230 are disposed around the lens 222 in a ring shape. Also, a ring-shaped polarizing filter 232 is disposed on top of the emitting devices 231.

Figure 4A:
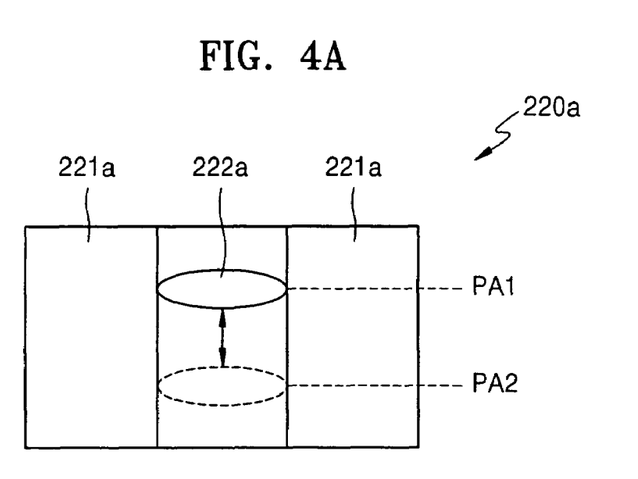
FIGS. 4A and 4B are vertical cross-sectional views of the lens unit of FIG. 1, according to an embodiment of the present invention.
Figure 4B:
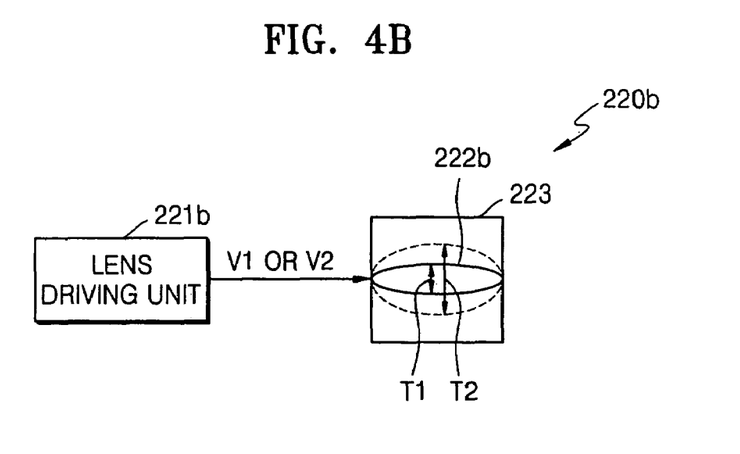

FIGS. 4A and 4B are vertical cross-sectional views of two embodiments of the lens unit 220 of FIG. 1. FIG. 4A is a vertical cross-sectional view of a lens unit 220a including a solid lens 222a. Referring to FIG. 4A, the lens unit 220a includes a lens driving unit 221a and the solid lens 222a. The lens driving unit 221a shields the solid lens 222a. The lens driving unit 221a moves the solid lens 222a to a first focal position PA1 with respect to the subject 31 (refer FIG. 2) in response to the first focus control signal FCTL1, and moves the solid lens 222a to a second focal position PA2 that is more distant from the subject 31 in response to the second focus control signal FCTL2. As a result, a focus of the lens unit 220a is controlled.

A focus of the solid lens 222a is more appropriate to photograph people or landscape as determined by a user when the solid lens 222a is moved to the first location PA1. Alternatively, the second location PA2 of the solid lens 222a results in a focus level that is more appropriate for photographing the fingerprint 31 in FIG. 2. The solid lens 222a of FIG. 4A has a fixed thickness. The detailed structure and operation descriptions of the lens unit 220a will be omitted since they are individually well known by those skilled in the related art.

FIG. 4B is a view of a lens unit 220b including a liquid lens 222b in an alternative embodiment of the present invention. Referring to FIG. 4B, the lens unit 220b includes a lens driving unit 221b and the liquid lens 222b. The lens driving unit 221b applies a first voltage V1 to the liquid lens 222b in response to the first focus control signal FCTL1, and applies a second voltage V2, which is lower than the first voltage V1, to the liquid lens 222b in response to the second focus control signal FCTL2. The liquid lens 222b responds to the first voltage V1 by decreasing its thickness, and responds to the second voltage V2 by increasing its thickness.

As shown in FIG. 4B, when the first voltage V1 is applied to the liquid lens 222b, the liquid lens 222b has a thinner focal thickness T1. Alternatively, when the second voltage V2 is applied to the liquid lens 222b, the liquid lens 222b has a thicker focal thickness T2. When the thickness of the liquid lens 222b is T1, the focus level of the lens unit 220b is more appropriate for photographing people or landscape as determined by the user. Alternatively, when the thickness of the liquid lens 222b is T2, the focus level of the lens unit 220b is more appropriate for photographing the fingerprint 31 of FIG. 2. Since the detailed structure and operation descriptions of the lens unit 220b are well known individually by those skilled in the related art, their descriptions will be omitted.

Figure 5:
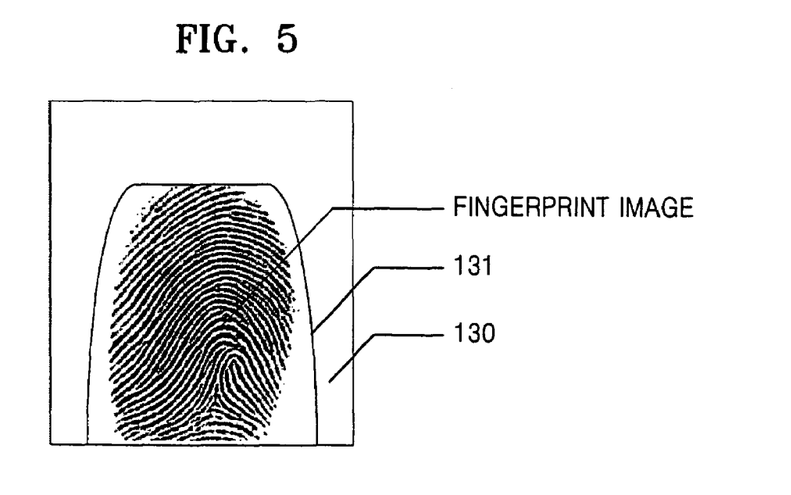
FIG. 5 shows an example display on a displaying device of FIG. 1, according to an embodiment of the present invention.

FIG. 5 shows an example display on the displaying device 130 of FIG. 1. As shown in FIG. 5, the displaying device 130 displays the guideline 131 in the fingerprint photograph mode. Therefore, the user may place a finger at the predetermined fingerprint location P1 (see FIG. 2) on which the light of the illuminating device 230 is focused while checking an image displayed on the displaying device 130.

Figure 6:
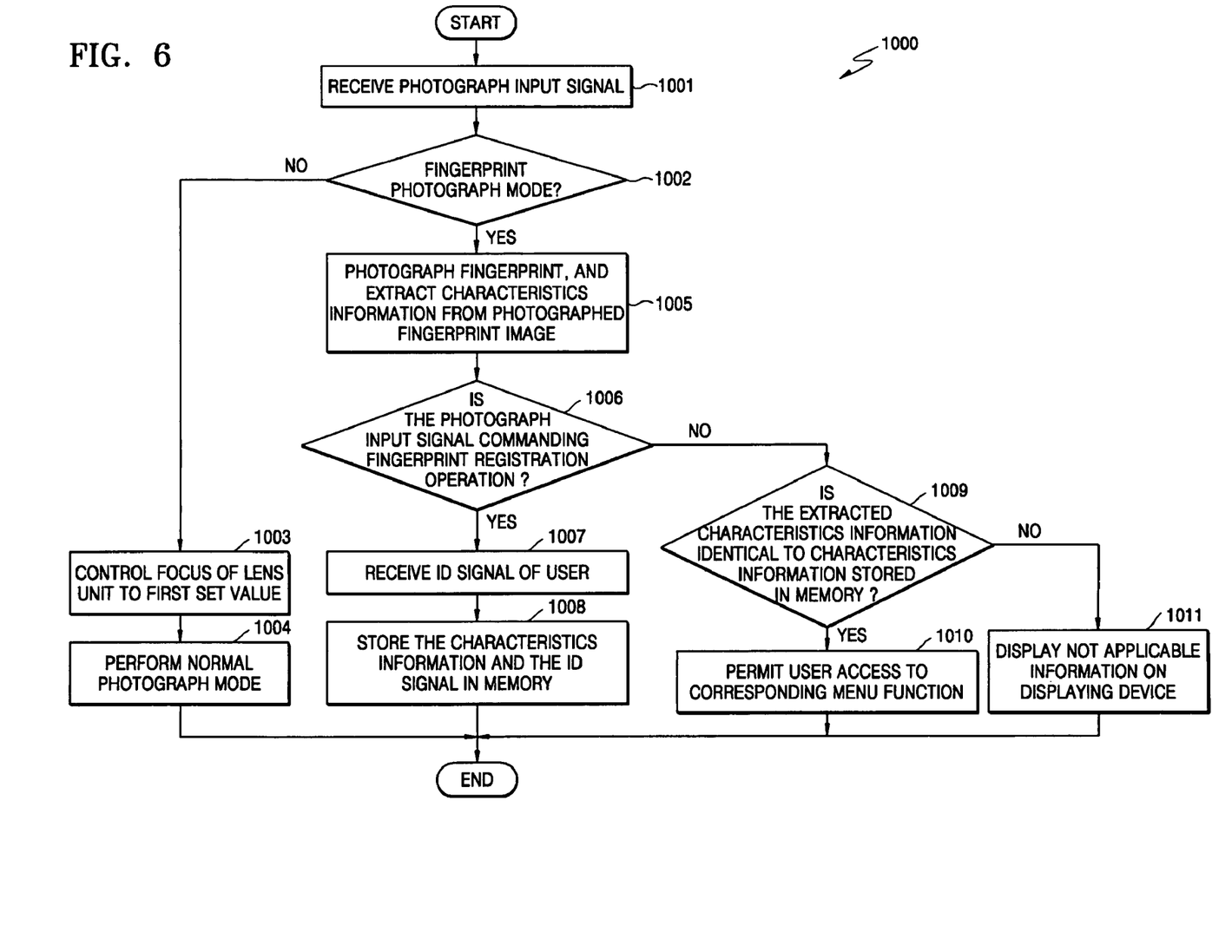
FIG. 6 is a flowchart of steps during operation of the mobile phone of FIG. 1, according to an embodiment of the present invention.
Figure 7:
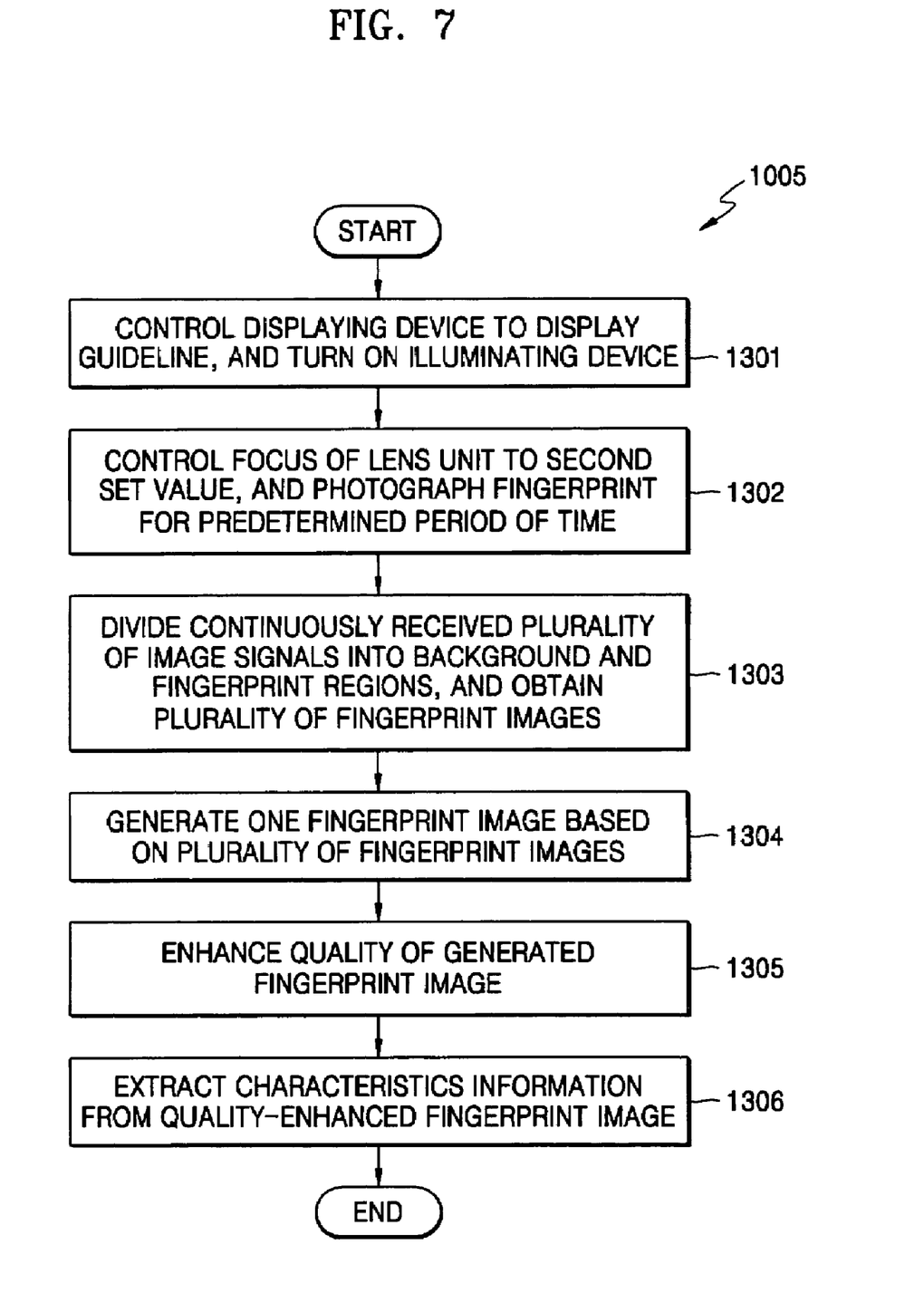
FIG. 7 is a flowchart of sub-steps for extracting characteristics information during a step of FIG. 6, according to an embodiment of the present invention.

Next, steps for performing the fingerprint security function in the mobile phone 100 are described in reference to the flowcharts 1000 of FIG. 6 and 1005 of FIG. 7, according to an embodiment of the present invention. In one embodiment of the present invention, referring to FIGS. 1 and 10, the data processor 250 in the main controller 120 performs the steps of FIGS. 6 and 7 when the data processor 250 executes sequences of instructions stored in the memory 140.

Referring to FIG. 6, the main controller 120 receives the control signal set PINS (i.e., the photograph request signal PREQ, the registration request signal RREQ, or the authentication request signal AREQ) from the key input unit 110 (step 1001 of FIG. 6). The main controller 120 responds to the control signal set PINS and determines whether the mobile phone 100 is in the fingerprint photograph mode (step 1002 of FIG. 6). The main controller 120 determines that the mobile phone 100 is in the fingerprint photograph mode when the registration request signal RREQ or the authentication request signal AREQ is received, and determines that the mobile phone 100 is in the normal photograph mode when the photograph request signal PREQ is received.

If the mobile phone 100 is in the normal photograph mode, the main controller 120 controls the lens controller 210 to adjust the focus of the lens unit 220 in the camera unit 200 to the first focus level (step 1003 of FIG. 6). In more detail, the main controller 120 outputs the first photograph control signal PCTL1, and deactivates the display control signal DCTL. In response to the first photograph control signal PCTL1, the lens controller 210 outputs the first focus control signal FCTL1. The lens unit 220 responds to the first focus control signal FCTL1, and adjusts the focus of the lens unit 220 to the first focus level.

In addition, the illuminating device 230 is turned "off" in response to the first photograph control signal PCTL1, and the displaying device 130 does not display the guideline 131 for photographing a fingerprint in response to the deactivated display control signal DCTL. Subsequently, the camera unit 200 performs normal photographing operations, i.e., photographing operations to take portrait or landscape pictures as determined by the user (step 1004 of FIG. 6). Thereafter, the flowchart of FIG. 6 ends until a new one of the control signal set PINS is received.

Referring back to step 1002 of FIG. 6, if the mobile phone 100 is in the fingerprint photograph mode, a fingerprint is photographed, and characteristics information E_FIF of a fingerprint image is extracted (step 1005 of FIG. 6). Sub-steps of step 1005 are described in more detail later with reference to FIG. 7. Then, the main controller 120 determines whether the control signal set PINS indicate the user's desire to register the fingerprint (step 1006 of FIG. 6).

When the received one of the control signal set PINS is the registration request signal RREQ that indicates fingerprint registration, the main controller 120 receives an identification (ID) signal ID_S of a user via the key input unit 110 (step 1007 of FIG. 6). Subsequently, the main controller 120 stores the characteristics information E_FIF and the ID signal ID_S in the memory 140 (step 1008 of FIG. 6). Thereafter, the flowchart of FIG. 6 ends until a new one of the control signal set PINS is received.

Alternatively referring to step 1006 of FIG. 6, when the received one of the control signal set PINS is the authentication request signal AREQ indicating fingerprint authentication, the main controller 120 compares an extracted characteristics information E_FIF and characteristics information S_FIF stored in the memory 140 (step 1009 of FIG. 6). If the extracted characteristics information E_FIF and the stored characteristics information S_FIF are substantially the same, the main controller 120 permits user access to a corresponding menu function (step 1010 of FIG. 6).

Alternatively, if the extracted characteristics information E_FIF and the stored characteristics information S_FIF are not substantially the same, the main controller 120 displays a not applicable information of the corresponding menu function via the displaying device 130 to indicate that the user is denied access to such a menu function (step 1011 of FIG. 6). Thereafter, the flowchart of FIG. 6 ends until a new one of the control signal set PINS is received.

FIG. 7 is a flowchart of sub-steps of the step 1005 of FIG. 6 for extracting characteristics information from the fingerprint images. Referring to FIG. 7, the main controller 120 controls the displaying device 130 to display the guideline 131, and turns "on" the illumination device 220 (step 1301 of FIG. 7). Also, the main controller 120 controls the lens controller 210 to adjust the focus of the lens unit 220 to the second focal level appropriate for photographing a fingerprint for a predetermined period of time in the camera unit 200 (step 1302 of FIG. 7).

In more detail, the main controller 120 outputs the second photograph control signal PCTL2, and enables the display control signal DCTL in response to the registration request signal RREQ or the authentication request signal AREQ. In response to the second photograph control signal PCTL1, the lens controller 210 outputs the second focus control signal FCTL2, and the illuminations device 230 is turned "on." The displaying device 130 responds to the display control signal DCTL, and displays the guideline 131 for photographing a fingerprint.

Thereafter, the main controller 120 continuously receives a plurality of image signals PT1 through PTK of the fingerprint from the camera unit 200. In addition, the main controller 120 divides each of the image signals PT1 through PTK into the background region and the fingerprint region to obtain a plurality of fingerprint images (step 1303 of FIG. 7). Here, images photographed by the camera unit 200 include not only fingerprint images but also outside background images.

Thus, an operation to separate only the fingerprint images from the photographed images is needed. Here, the division of the background region and the fingerprint region may be obtained by an image difference between two continuous images. When photographing to obtain the two continuous images, a distance from a subject to a lens may be slightly different. Thus, the size of the fingerprint region of the two continuous images is different. Also, because the background region is a longer image distance, there is hardly a change in the size of the image. Consequently, the image difference between the two continuous images indicates a boarder line of an outline of the fingerprint, and a region inside the boarder line of the fingerprint is the fingerprint region.

The main controller 120 generates one fingerprint image based on the plurality of fingerprint images obtained in step 1303 (step 1304 of FIG. 7). In more detail, since the sizes of the plurality of fingerprint images are different, the main controller 120 adjusts the sizes of the plurality of fingerprint images to be identical. Here, the main controller 120 magnifies or reduces the size of the fingerprint images with respect to a fingerprint image with the best-focused fingerprint image.

The best-focused fingerprint image is determined by a dispersion value of the brightness of the fingerprint image. For example, a well-focused fingerprint image has a high dispersion value because the difference in brightness between the ridges and valleys of the fingerprint is high. In contrast, an ill-focused fingerprint image has a low dispersion value because the difference in brightness between the ridges and valleys of the fingerprint is low. Therefore, the fingerprint image having the best focus has the highest dispersion value.

The main controller 120 magnifies or reduces the size of the fingerprint images with respect to the best-focused fingerprint image. Then, the main controller 120 generates one fingerprint image based on the fingerprint images that have been magnified or reduced to an identical size. Such a process is now described in more detail in reference to FIGS. 8A, 8B, and 8C.

Figure 8A:
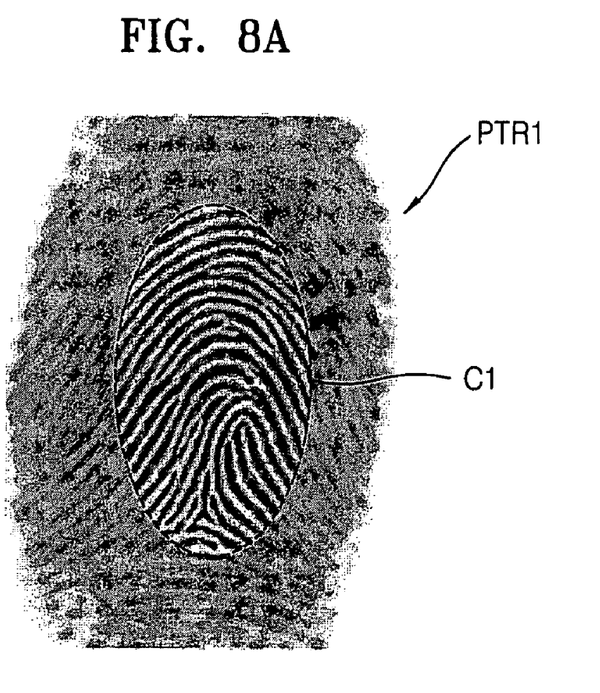
FIGS. 8A, 8B, and 8C show example fingerprint images photographed by a camera unit of FIG. 1, according to an embodiment of the present invention.
Figure 8B:
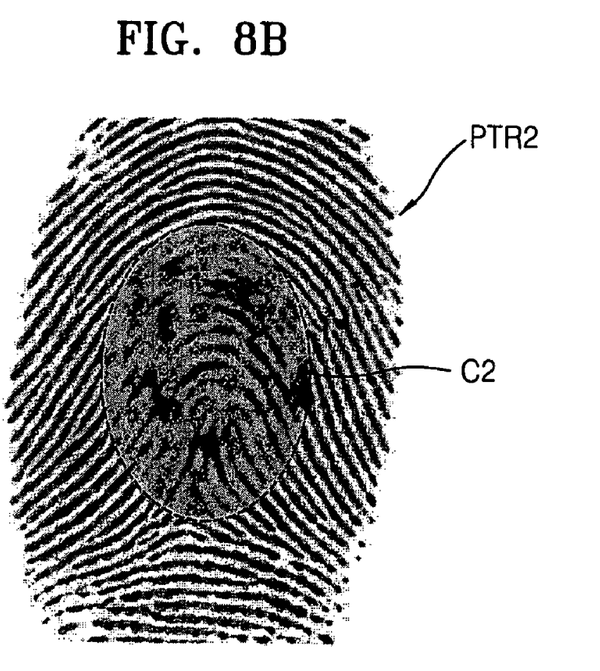
Figure 8C:
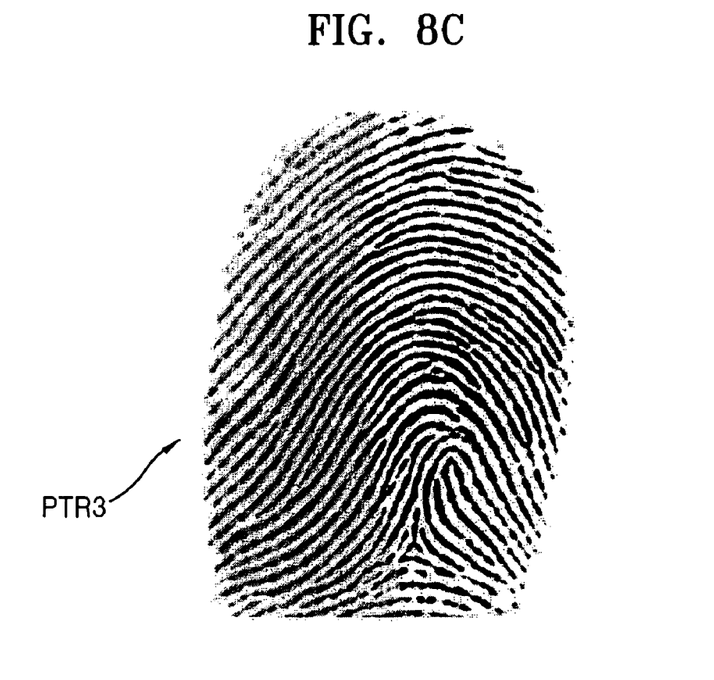

FIGS. 8A, 8B, and 8C are views of fingerprint images PTR1, PTR2, and PTR3, respectively, photographed by the camera unit 200. The focus of the lens unit 220 is typically focused on a portion of a surface of a finger and not on the entire surface of the finger because the surface of the finger is curved. As a result, as illustrated in FIGS. 8A and 8B, only a portion of the fingerprint images PTR1 and PTR2 photographed by the camera unit 200 is focused.

The fingerprint image PTR1 of FIG. 8A is when the focus of the lens unit 220 is focused on a center portion C1 of the fingerprint, and thus only the center portion C1 is photographed clearly. The fingerprint image PTR2 of FIG. 8B is when the focus of the lens unit 220 is focused on the outside of a center portion C2 of the fingerprint, and thus only the outside portion is photographed clearly.

The main controller 120 combines the plurality of fingerprint images that are photographed with only a portion focused (such as PTR1 and PTR2), and generates one fingerprint image PTR3 of FIG. 8C with the whole fingerprint substantially focused. When the plurality of fingerprint images are combined, portions that overlap or does not overlap among the plurality of fingerprint images may exist. The main controller 120 generated the one fingerprint image PTR3 by making the portion that overlaps to have a mean value of the brightness value of the fingerprint images, and making the portion that does not overlap to have a brightness value of each of the fingerprint images.

The brightness of the combined fingerprint image PTR 3 may be non-uniformly shown depending on external and internal lighting. The external light, for example, may be the sun or a fluorescent lamp, and the internal light may be the illuminating device 220. Referring to FIG. 8C, a left portion of the fingerprint image PTR3 is relatively brighter than a right portion thereof. An operation to enhance the quality of the fingerprint image PTR3 is needed to clearly divide a ridge portion and a valley portion of the fingerprint by compensating for the brightness variations in the fingerprint image PTR3.

The main controller 120 compensates for the brightness variation in the fingerprint image PTR3 by adjusting the brightness to be uniform across the fingerprint image PTR3 thus improving the quality of the fingerprint image PTR3 (step 1305 of FIG. 7)). Explaining step 1305 in more detail, the main controller 120 divides the fingerprint image PTR3 into a plurality of blocks $B_{ij}$ (not shown) having a pixel size of M×M (M is an integer). Then, the main controller 120 finds a maximum brightness value $M_{ij}$ for each of the plurality of blocks $B_{ij}$. Also, the main controller 120 sets the maximum brightness value $M_{ij}$ as a brightness value of a center portion of each of the plurality of blocks $B_{ij}$, and calculates a brightness distribution value D using a linear interpolation method from a brightness value of each of the rest of the portion of the blocks $B_{ij}$ and a maximum brightness value of neighboring blocks. The detailed description of the linear interpolation method will be omitted since it is individually well known to those skilled in the related art.

Figure 9:
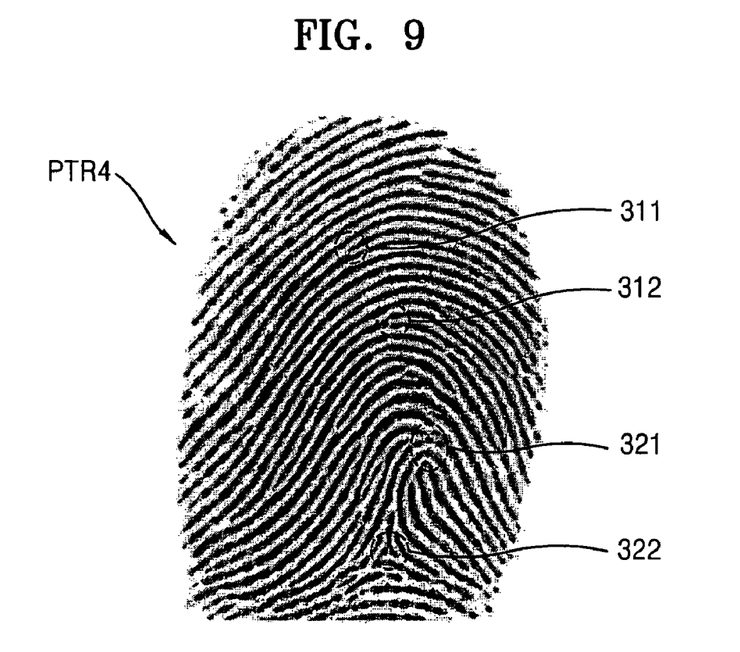
FIG. 9 shows an example fingerprint image with improved quality, according to an embodiment of the present invention.
Figure 10:
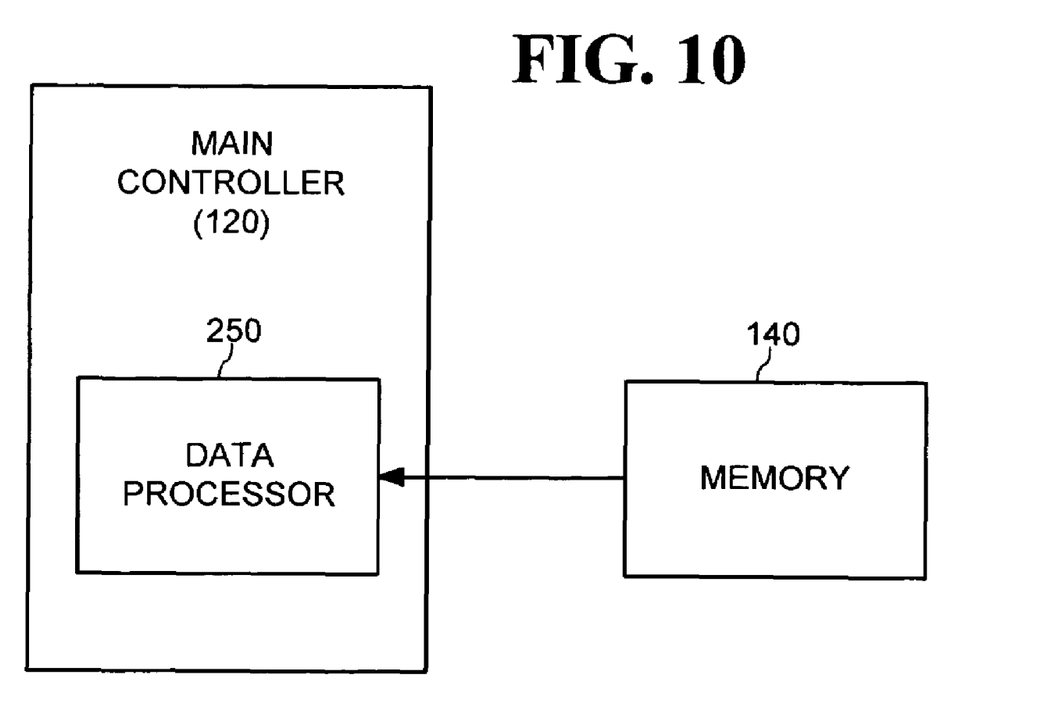
FIG. 10 shows a block diagram with a data processor in a main controller of FIG. 1, according to an embodiment of the present invention.

Also, the main controller 120 calculates a maximum value $M_{max}$ from the maximum brightness values $M_{ij}$, and calculates a brightness compensating value CP, which is a difference value between the maximum value $M_{max}$ and the maximum brightness values $M_{ij}$. The main controller 120 adds the brightness compensating value CP to the brightness values of each of the rest of the portion of the blocks $B_{ij}$, and uniformly compensates the brightness of the fingerprint image PTR3. As a result, as illustrated in FIG. 9, a fingerprint image PTR4 having a uniform brightness is achieved.

For fingerprint authentication, if the entire fingerprint image PTR4 is used for such authentication, memory capacity and data processing time is increased in the mobile phone 100. To minimize memory capacity and data processing time, the main controller 120 extracts the characteristics information E_FIF from the fingerprint image PTR4 (step 1306 of FIG. 7). Such characteristics information E_FIF is stored and processed instead of the whole fingerprint image PTR4 for minimizing memory capacity and data processing time.

The characteristics information E_FIF includes a ridge frequency, a minutia point, and a singular point. The ridge frequency indicates a distance between the ridges of the fingerprint. Referring to FIG. 9, the minutia point may be, for example, a point 311 where a ridge ends, or a point 312 where one ridge is divided into two ridges. The singular point may be, for example, a portion 321 where a ridge is curved a lot, or a point 322 where ridges form a triangle. In one example embodiment of the present invention, steps 1303, 1304, 1305, and 1306 are performed by the characteristics extracting module 121 of the main controller 120. In that case, the characteristics extracting module 121 and the matching module 122 may be implemented in the data processor 250.

In this manner, existing components of the built-in camera unit 200 are used for obtaining the fingerprint image for the fingerprint security function. Thus, since additional components are not used, cost and time for production of the electronic device are minimized.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the present invention has been described for the fingerprint security function in the mobile phone. However, the present invention can also be practiced with other types of electronic devices having a built-in camera.

What is claimed is:

1. A method of performing a fingerprint security function in an electronic device having a camera unit, comprising:
adjusting a focus of a lens in the camera unit to a first focus level when a control signal set indicates a normal photograph mode;
adjusting the focus of the lens in the camera unit to a second focus level different from the first focus level when the control signal set indicates a fingerprint photograph mode;
capturing a plurality of fingerprint images with the camera unit when the lens is set to a plurality of second focus levels; and
generating an enhanced fingerprint image with more uniform focus and brightness than said plurality of fingerprint images using said plurality of fingerprint images.

2. The method of claim 1, further comprising:
capturing a user-determined image with the camera unit when the lens is set to the first focus level.

3. The method of claim 1, further comprising:
extracting and storing characteristics information of the enhanced fingerprint image in a memory when the control signal set indicates registration of a user.

4. The method of claim 1, further comprising:
extracting and comparing characteristics information of the enhanced fingerprint image with registered characteristics information from a memory when the control signal set indicates authentication of a user.

5. The method of claim 1, further comprising:
emitting light toward a fingerprint location when the control signal set indicates the fingerprint photograph mode.

6. The method of claim 5, further comprising:
turning off the light toward the fingerprint location when the control signal set indicates the normal photograph mode.

7. The method of claim 1, wherein the electronic device is a mobile phone.

8. The method of claim 1, further comprising:
moving the lens to a first focal position when the control signal set indicates the normal photograph mode; and
moving the lens to a second focal position when the control signal set indicates the fingerprint photograph mode.

9. The method of claim 1, further comprising:
biasing the lens with a first voltage to set the lens to have a first focal thickness when the control signal set indicates the normal photograph mode; and
biasing the lens with a second voltage to set the lens to have a second focal thickness when the control signal set indicates the fingerprint photograph mode.

10. An electronic device, comprising:
a camera unit with a lens that is used to capture images;
a data processor; and
a memory having sequences of instructions stored thereon, wherein execution of the sequences of instructions by the data processor causes the data processor to perform the steps of:
receiving a control signal set from a user;
controlling a focus of a lens in the camera unit to be set to a first focus level when the control signal set indicates a normal photograph mode;

controlling the focus of the lens in the camera unit to be set to a second focus level different from the first focus level when the control signal set indicates a fingerprint photograph mode;

controlling the camera unit to capture a plurality of fingerprint images when the lens is set to a plurality of the second focus levels; and generating an enhanced fingerprint image with more uniform focus and brightness than said plurality of fingerprint images using said plurality of fingerprint images.

11. The electronic device of claim 10, wherein execution of the sequences of instructions by the data processor causes the data processor to further perform the step of:

controlling the camera unit to capture a user-determined image when the lens is set to the first focus level.

12. The electronic device of claim 10, wherein execution of the sequences of instructions by the data processor causes the data processor to further perform the step of:

extracting and storing characteristics information of the enhanced fingerprint image in the memory when the control signal set indicates registration of the user.

13. The electronic device of claim 10, wherein execution of the sequences of instructions by the data processor causes the data processor to further perform the step of:

extracting and comparing characteristics information of the enhanced fingerprint image with registered characteristics information from the memory when the control signal set indicates authentication of the user.

14. The electronic device of claim 10, further comprising:
an illuminating device in the camera unit;
and wherein execution of the sequences of instructions by the data processor causes the data processor to further perform the step of:

controlling the illuminating device to emit light toward a fingerprint location when the control signal set indicates the fingerprint photograph mode.

15. The electronic device of claim 14, wherein execution of the sequences of instructions by the data processor causes the data processor to further perform the step of:

controlling the illuminating device to turn off the light toward the fingerprint location when the control signal set indicates the normal photograph mode.

16. The electronic device of claim 10, wherein the electronic device is a mobile phone.

17. The electronic device of claim 10, wherein execution of the sequences of instructions by the data processor causes the data processor to further perform the steps of:

controlling the lens to move to a first focal position when the control signal set indicates the normal photograph mode; and controlling the lens to move to a second focal position when the control signal set indicates the fingerprint photograph mode.

18. The electronic device of claim 10, wherein execution of the sequences of instructions by the data processor causes the data processor to further perform the steps of:

controlling a bias on the lens to be a first voltage to set the lens to have a first focal thickness when the control signal set indicates the normal photograph mode; and controlling the bias on the lens to be a second voltage to set the lens to have a second focal thickness when the control signal set indicates the fingerprint photograph mode.

* * * * *